(12) United States Patent
Barutzky et al.

(10) Patent No.: US 7,377,581 B2
(45) Date of Patent: May 27, 2008

(54) ROOF STRUCTURE FOR A VEHICLE AND METHOD FOR PRODUCING SAID STRUCTURE

(75) Inventors: Stephan Barutzky, Bremen (DE); Martin Brodt, Weil der Stadt (DE); Peter Mack, Gaeufelden (DE)

(73) Assignee: DaimlerChrysler AG, Stuttgart (DE)

( * ) Notice: Subject to any disclaimer, the term of this patent is extended or adjusted under 35 U.S.C. 154(b) by 87 days.

(21) Appl. No.: 10/559,651

(22) PCT Filed: May 4, 2004

(86) PCT No.: PCT/EP2004/004741

§ 371 (c)(1),
(2), (4) Date: Oct. 4, 2006

(87) PCT Pub. No.: WO2004/098758

PCT Pub. Date: Nov. 18, 2004

(65) Prior Publication Data

US 2007/0057537 A1  Mar. 15, 2007

(30) Foreign Application Priority Data

May 5, 2003 (DE) .......................... 203 06 915 U

(51) Int. Cl.
*B62D 25/06* (2006.01)
(52) U.S. Cl. .................. 296/210; 296/203.03
(58) Field of Classification Search ........... 296/203.03, 296/210, 185.1, 193.05, 203.01
See application file for complete search history.

(56) References Cited

U.S. PATENT DOCUMENTS

| 5,018,781 A | 5/1991 | Kumasaka et al. |
| 5,968,298 A | 10/1999 | Staquet et al. |
| 2003/0020302 A1 | 1/2003 | Lumpe et al. |

FOREIGN PATENT DOCUMENTS

| DE | 197 45 126 C1 | 3/1999 |
| DE | 197 46 165 A1 | 4/1999 |
| EP | 1 108 640 A2 | 6/2001 |
| FR | 2 818 228 A3 | 6/2002 |
| JP | 2000-344135 A | 12/2000 |
| JP | 2003-341547 A | 12/2003 |

OTHER PUBLICATIONS

International Search Report Dated Sep. 10, 2004 (four (4) pages).

*Primary Examiner*—Joseph D Pape
(74) *Attorney, Agent, or Firm*—Crowell & Moring LLP

(57) ABSTRACT

The invention relates to a roof structure for a vehicle with a roof panel (1), with side wall panels (2) and with a front and rear roof frame (10, 11), the roof panel (1) having a front side (3) and a rear side (4) and a longitudinal side (5, 6) on both sides, and the front roof frame (10) being assigned to the front side (3) of the roof panel (1) and the rear roof frame (11) being assigned to the rear side (4). The roof panel (1) is connected at least indirectly at its longitudinal sides (5, 6) to the side wall panels (2). The roof panel (1) is connected to the side wall panel (2) and/or to the front roof frame (10) and/or to the rear roof frame (11) via an angled bar (20). The invention likewise relates to a method for producing the roof structure.

14 Claims, 4 Drawing Sheets

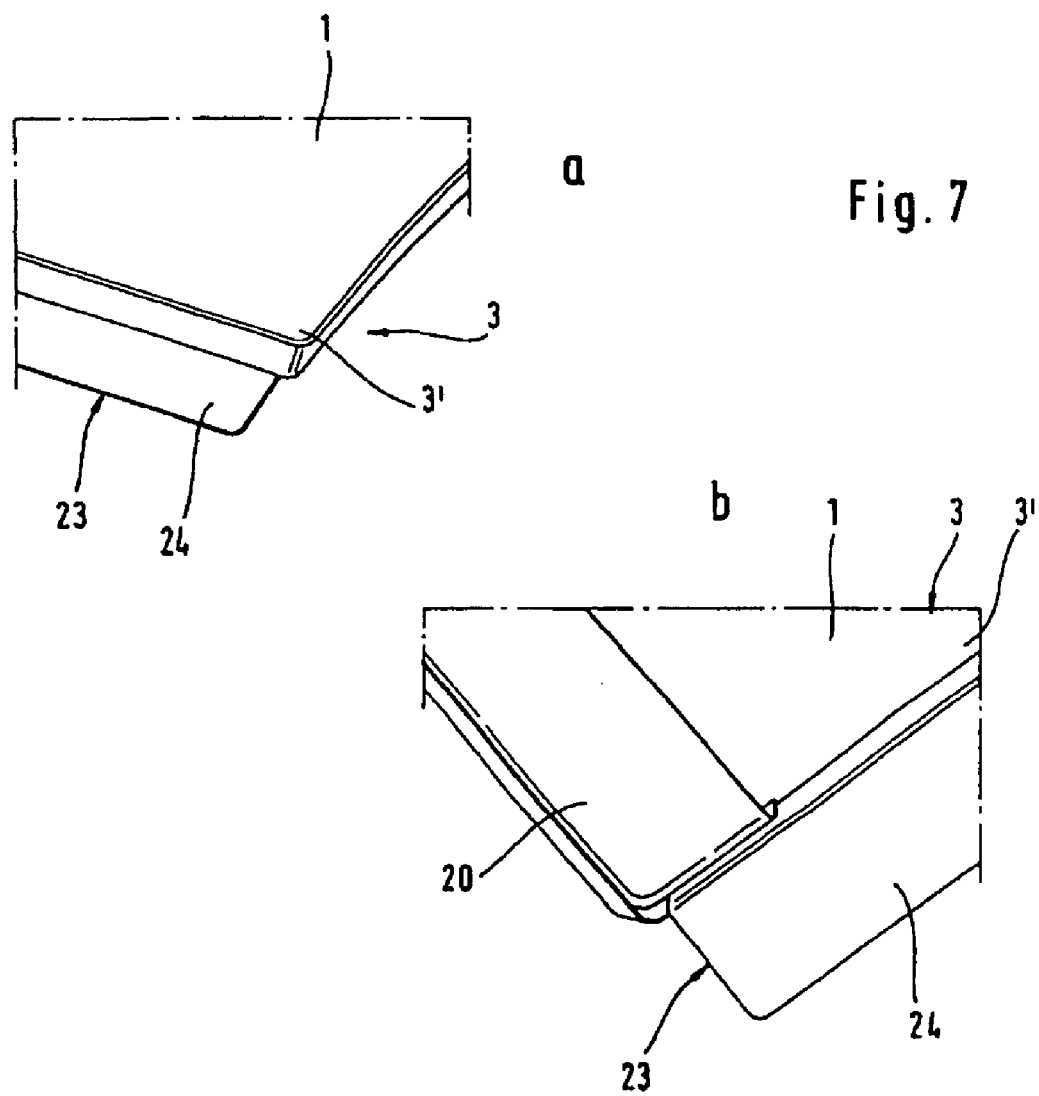

ROOF STRUCTURE FOR A VEHICLE AND METHOD FOR PRODUCING SAID STRUCTURE

BACKGROUND AND SUMMARY OF THE INVENTION

The present invention relates to a roof structure for a vehicle and the method for producing said structure.

A roof structure for a vehicle is disclosed DE 197 45 126 C1. A frame-shaped roof inner part is arranged between a roof panel and side wall panels and is connected in an alternating manner to the roof panel and the side wall panels. In this case, a roof duct is formed between the roof panel and side wall panel. In the front and in the rear region, the roof inner part forms parts of the front and rear roof frame. The roof inner part is of step-shaped design in some sections on both longitudinal sides with pockets and adhesive application surfaces which are situated in between and are in the form of steps which extend virtually over the width of the roof duct. The roof inner part is spot-welded to the side wall panel in the pockets while the roof inner part is adhesively bonded to the roof panel at the steps. The roof panel is provided with lateral extension strips which at least largely cover the upper side of the roof duct. As a result, a relatively narrow roof duct is achieved visually which can be closed by a narrow sealing strip, a weather strip, a decorative roof bar or the like.

U.S. Pat. No. 5,968,298 A discloses a roof structure for a vehicle with a roof panel, with side wall panels and with a front and rear roof frame, the roof panel having a front side and a rear side and a longitudinal side on both sides, and the front roof frame being assigned to the front side of the roof panel and the rear roof frame being assigned to the rear side, and the roof panel being connected at least indirectly at its longitudinal sides to the side wall panels, the roof panel being connected to the side wall panels and/or to the front roof frame and/or to the rear roof frame via one or more angled bars.

FR-A-2 818 228, which forms a generic type, discloses a roof structure for a vehicle with a roof panel, with side wall panels and with a front and rear roof frame. The roof panel has a front side and a rear side and a longitudinal side on both sides, and the front roof frame is assigned to the front side of the roof panel and the rear roof frame is assigned to the rear side. The roof panel is connected at least indirectly at its longitudinal sides to the side wall panels and is connected to the side wall panels and/or to the front roof frame and/or to the rear roof frame via one or more angled bars. An essentially vertical limb of the angled bar projects upward to the roof panel, and an essentially horizontal limb of the angled bar projects away from the side wall panel The roof panel furthermore is angled downward at its longitudinal sides with an edge strip and being connected to the vertical limb of the angled bar, and the horizontal limb of the angled bar being connected to a flange of the side wall panel.

An object of the present invention is to provide a roof structure and a method for producing said structure, in which a roof duct which is as narrow as possible can be achieved.

The object is achieved according to the present invention by the edge strip is angled away from the roof panel by at least 90° so as to project under the roof panel.

According to the present invention, a roof panel is connected to a side wall panel and/or to a front roof panel and/or to the rear roof panel via an angled bar. Furthermore, an essentially vertical limb of the angled bar projects upward to the roof panel and an essentially horizontal limb of the angled bar products away from the side wall panel. The angled bar is concealed by the roof panel. Furthermore, the roof panel is angled downward at its longitudinal sides with an edge strip of and is connected to the vertical limb of the angled bar, and the horizontal limb of the angled bar is connected to a flange of the side wall panel. The roof panel and angled bar can be joined together from the inside and a joining region does not need to be accessible from the outside. A roof duct between the side wall panel and roof panel can therefore be designed freely and minimized.

According to the present invention, the edge strip is angled away from the roof panel by at least 90° and therefore projects under the roof panel. If is therefore ensured that the roof panel protrudes over the angled bar. The edge strip, and therefore a joining region between the roof panel and angled bar, is covered by the roof panel. One advantage is that the angled bar, unlike a roof inner part, does not constitute a reinforcement of the roof panel, but merely constitutes a structural element which is inserted during the joining of the roof structure. A roof duct of the roof structure can therefore be constructed virtually as desired, in particular with regard to width and filling or covering, and can be designed, in particular, as an indistinct joint. The configurate of a conventional roof duct is shaped essentially by the dimensions of the individual parts and the necessity of accessibility during assembly for the processes used for joining the roof structure. Similarly, the present invention realizes, in a simple manner, a roof structure in a light-weight construction or sandwich-type construction, in particular with different materials. The roof panel can be brought right up to the side wall panel.

In a currently preferred development of the invention, the front side and/or the rear side of the roof panel is of stepped configurate at its end and ends in a lowered flange, the lowered flange being provided for receiving a window. This arrangement is suitable particularly for a roof panel made from steel.

In a further preferred development of the invention, an angled bar is arranged on the front side and/or rear side of the roof panel, the essentially horizontal limb of which projects away from the roof panel and is provided for receiving a window. The front side and/or rear side of the roof panel is preferably angled by at most 90°. The respective essentially vertical limb engages behind the angled and of the front side and/or rear side of the roof panel. This arrangement is suitable particularly for a roof panel in a light-weight construction, in particular a roof panel made from aluminum or an aluminum alloy.

BRIEF DESCRIPTION OF THE DRAWINGS

FIG. 7(a) is a view of a roof panel obliquely from the front with an angled bar at the front, and FIG. 7(b) is a view of the roof panel with an angled bar from below.

DETAILED DESCRIPTION OF THE DRAWINGS

Identical or corresponding elements in the various figures are in each case referred to by the same reference numbers.

Figure 1:
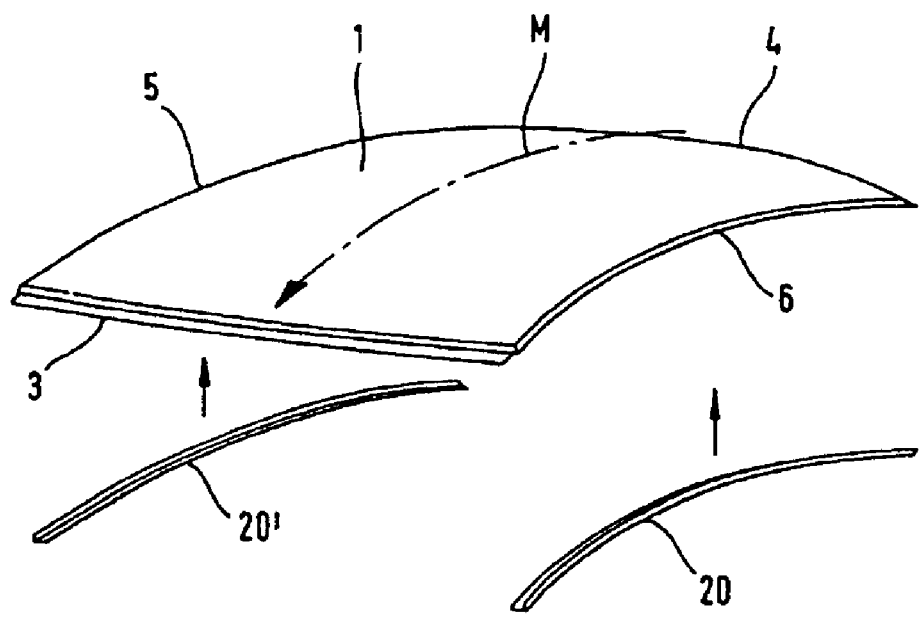
FIG. 1 is an exploded perspective view of a roof panel with preferred angled bars along longitudinal sides.
Figure 3:
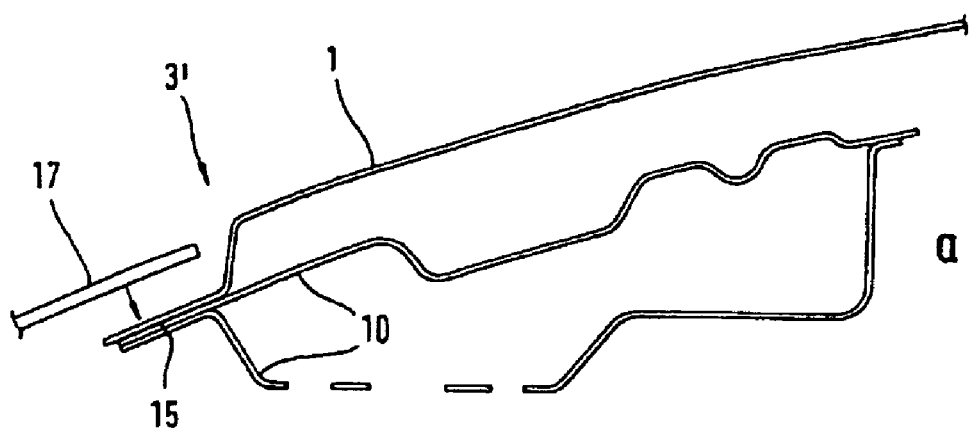
FIG. 3(a) is a front side of the roof panel with a window.
FIG. 3(b) is a view of the rear side of the roof panel with a window.
Figure 3:
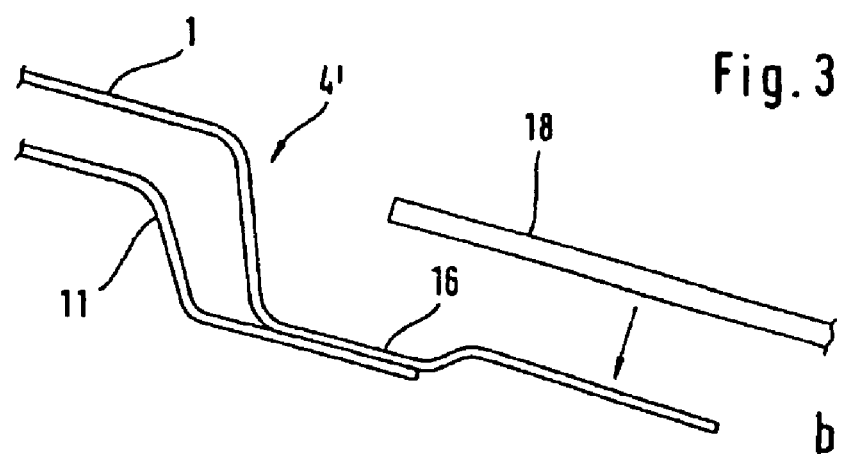

FIG. 1 shows, in an exploded view, a detail of a currently preferred refinement of the invention. A roof panel 1 is part of a roof structure (not illustrated specifically) for a vehicle, with the roof panel 1 having a front side 3, a rear side 4 and longitudinal sides 5, 6. As explained in more detail later on regarding FIG. 3, the rear side 4 is assigned to a rear roof frame 11 and the front side 3 is assigned to a front roof frame 10.

The roof panel 1 has an imaginary center line M in the longitudinal direction which corresponds to a traveling direction of the vehicle. For connection to the roof structure, angled bars 20, 20' are provided on both longitudinal sides in order to connect the right and the left longitudinal sides 5, 6 of the roof panel 1 to the roof structure. In contrast to the prior art, for this purpose, rather than using a roof inner part which is also used for reinforcing the roof panel, the angled bars 20, 20' merely form structural elements which serve to fasten the roof panel. The angled bars 20, 20' are arranged on the lower side of the left and right longitudinal sides 5, 6 of the roof panel 1 and are concealed by the latter. On the front side 3, the roof panel 1 is preferably of stepped configurate in order to form a rest for a window 17, in particular a windshield.

Figure 2:
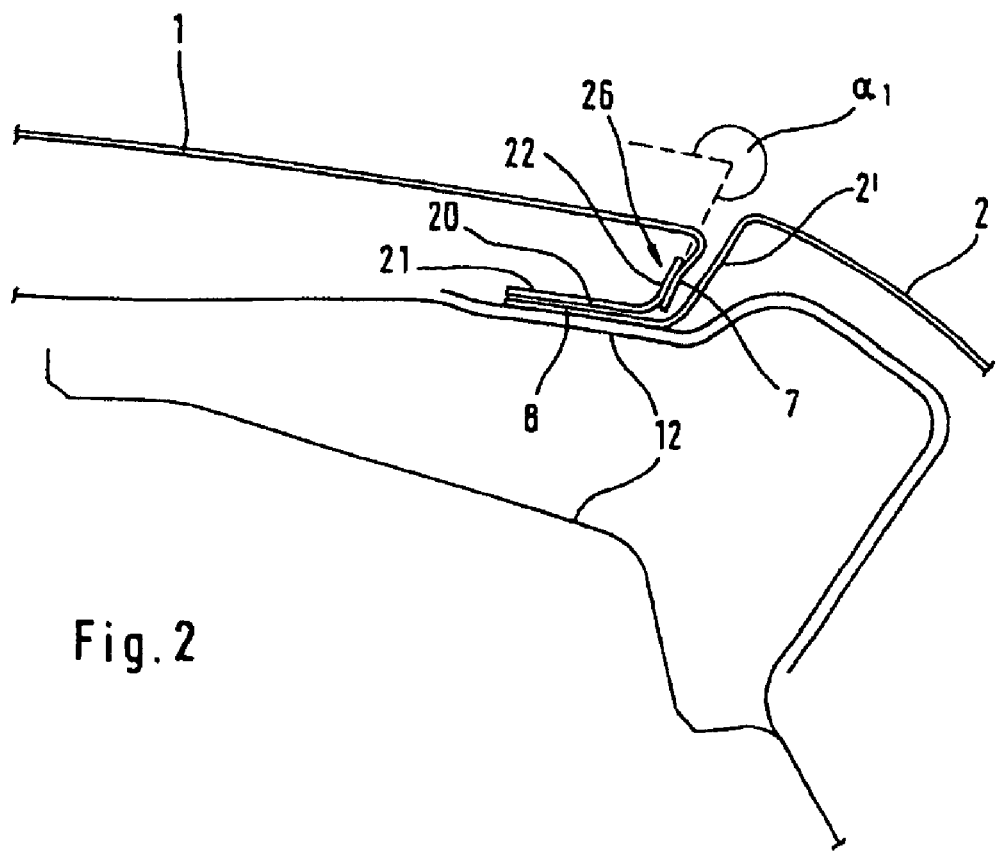
FIG. 2 is a sectional view of the panel shown in FIG. 1 in the region of the longitudinal sides.

FIG. 2 shows, as preferred refinement of the invention, a section transversely through one of the longitudinal sides 5, 6 of a roof panel 1 in the fitted state. The roof panel 1 is connected to the side wall pane 2 via the angled bar 20. The arrangement is, of course, mirror-symmetrical to the center line M in FIG. 1.

In addition to the roof panel 1, the roof structure has side wall panels 2 arranged above a lateral roof frame 12. The lateral roof frame 12 may have reinforcing elements. An essentially vertical limb 22 of the angled bar 20 projects upward to the roof panel 1 and engages behind an angled edge strip 7 of the roof panel 1. An essentially horizontal limb 21 of the angled bar 20 projects away from the side wall panel 2 under the roof panel 1. The side wall panel 2 is of stepped configurate and projects with a flange 8 under the roof panel 1 and the horizontal limb 22 of the angled bar 20. Adjacent to the roof panel 1, the side wall panel 2 is higher than the roof panel 1.

The roof panel 1 is angled downward at its longitudinal sides 5, 6 with an edge strip 7 which is angled away from the roof panel 1 by an angle $\alpha_1$ of at least 90°, so that it points under the roof panel 1. The angled bar 20 is fastened from the inside by the vertical limb 22 to the edge of the roof panel 1. The horizontal limb 21 of the angled bar 20 is connected to the flange 8 of the side wall panel 2.

The sharp angling of the edge strip 7 allows the roof panel 1 to use its edge strip 7 to completely cover the angled bar 20. Particularly preferably, a flank 2' of the side wall panel 2 is inclined in such a manner that the angled edge strip 7 and the flank 2' run largely parallel. The edge strip 7 and the flank 2' can therefore be brought together very closely, so that a very narrow roof duct between the roof panel 1 and side wall panel 2 results. In addition, the side wall panel 2 protrudes in height over the roof panel 1, so that a narrow roof duct is additionally also bonded together visually and merely forms an indistinct joint. Decorative bars, weather strips or the like for covering the roof duct can therefore b omitted. However, the width and filling of the roof duct may optionally also be configured differently. Thus, depending on requirements, the roof duct may be open (an indistinct joint), a weather strip, in particular an elastomer weather strip, may be inserted, a PVC filling may be provided, the roof duct may be soldered up, preferably in the case of a roof panel made from steel, a decorative bar which may be anodized or painted in desired colors and may optionally be encapsulated by an elastomer may be inserted into the roof duct, or the roof duct may be filled with a sealing foam adhesive which expands upon oven treatment and completely fills the roof duct.

The cross section through the roof panel 1 and angled bar 20 is approximately U-shaped. This shape is particularly favorable for a joining process. A welding electrode (not illustrated) or a laser beam can thus be brought up to the angled bar 20 from the inside and can connect the angled bar 20 and the roof panel 1 to each other in a joining region 26. A favorable joining process is, for example, spot-welding. The connection may optionally also be produced by blind rivets, screws, laser welding, soldering, laser soldering, MIG soldering (MIG=metal inert gas), MIG welding, MAG welding (MAG=metal active gas), MAG soldering, clinching, screwing and/or adhesive bonding. It is particularly favorable, in the case of joining region 26, to additionally provide a continuous bonded seam in order to obtain a joint region 26 which is as leakproof as possible.

The angled bars 20, 20' are preferably adhesively bonded to the side wall panels 2. The application of continuous beads of adhesive instead of individual spots of adhesive is favorable for a manufacturing process of large piece numbers.

FIGS. 3a and b show a preferred refinement of a roof panel 1 which is particularly suitable for a roof panel 1 made from steel which is to be connected to a vehicle cell or to side wall panels made from steel.

FIG. 3a shows a front roof frame 10 which is connected to a flange 15 at the end 3' of the front side 3 of the roof panel 1. The end 3' is of stepped configuration with the flange 15 being lowered downward with respect to the roof panel and running parallel to an edge of the rear roof frame 10, to which the flange 15 is connected. The flange 15 serves to secure a window 17 which forms the front windshield of the vehicle.

A rear roof frame 11 is connected to an angled end 4' of the rear side 4 of the roof panel 1, the end 4' likewise forming a step and tapering off in a flange 16. The flange 16, which is lowered downward with respect to the roof panel 1, is provided for securing a window 18 which forms the rear window of the vehicle. At the foot of the step, the flange 16 has a duct which is partially covered by the window 18.

Figure 4:
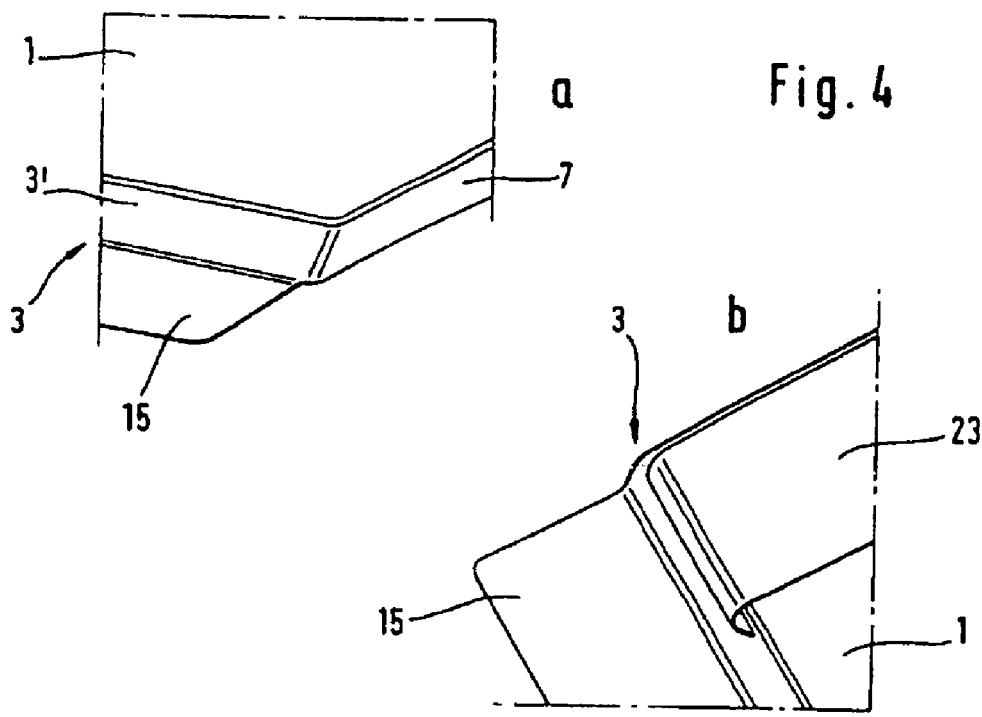
FIG. 4(a) is a view of a roof panel obliquely from the front.
FIG. 4(b) is a view of the roof panel with the angled bar from below.

FIGS. 4a and b show a detailed view of the roof panel 1. FIG. 4a shows the roof panel 1 obliquely from the front. The sharp angling by more than 90° on the longitudinal sides and the flange 15, which is lowered in a stepped manner, of the front side 3 can be seen. FIG. 4b shows a view from below. The angled bar 20 ends in front of the flange 15 and sits within the roof panel 1.

Figure 5:
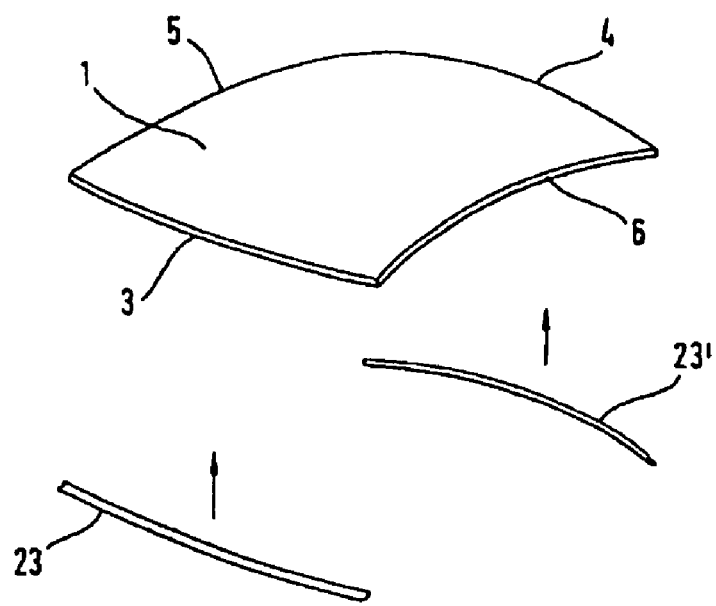
FIG. 5 is an exploded view of a roof structure with angled bars on the longitudinal sides and on the rear and front side.
Figure 5:
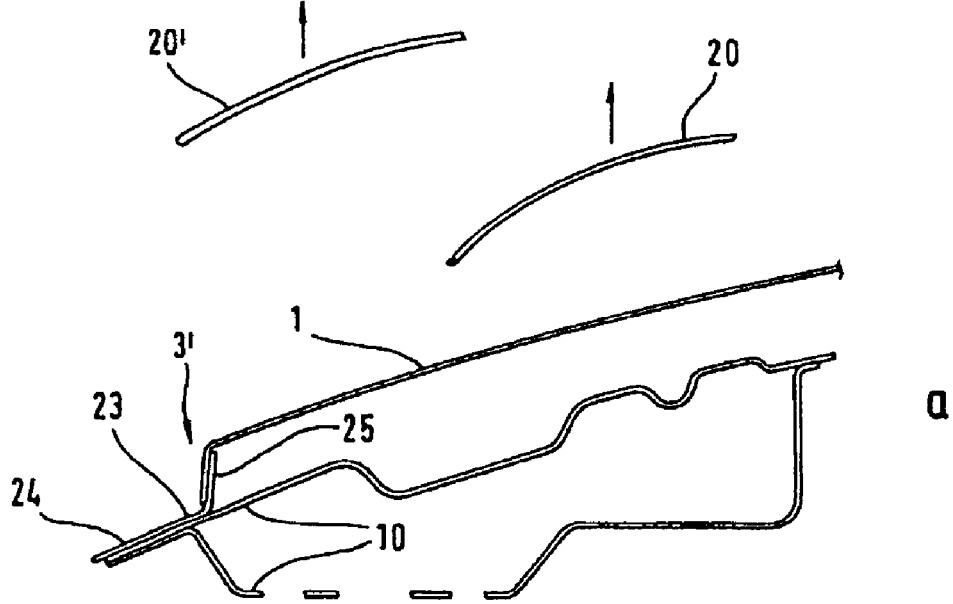

FIG. 5 shows a further currently preferred refinement of a roof panel 1 which is suitable for a hybrid roof i.e., the roof panel 1 is manufactured from a different material than the roof frame or a vehicle cell of the vehicle. In particular, for example, a roof panel 1 is made from light-weight metal, such as aluminum or an aluminum alloy. This arrangement is also particularly favorable for a roof panel 1 in a light-weight construction.

In order to connect the roof panel 1 to a roof structure (not illustrated in detail), angled bars 20 are again provided on both sides in order to connect the right and the left longitudinal sides 5, 6 of the roof panel 1 to said structure. Furthermore, front and rear angled bars 23, 23' are provided for connection to a front and rear roof frame 10, 11. The fastening of the roof panel 1 takes place here via these angled bars 23, 23' and not via a flange 15 of the roof panel 1. The angled bars 20, 20', 23, 23' are arranged on the lower side of the roof panel 1.

Figure 6:
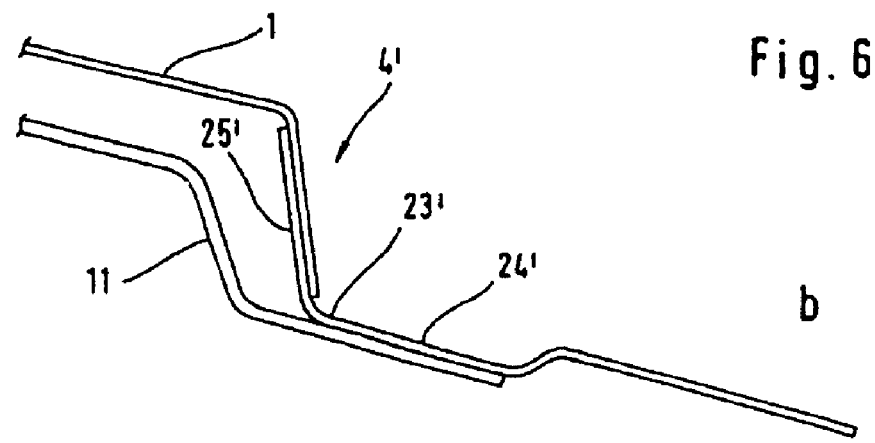
FIG. 6(a) is a view of a front side of the roof panel with a window.
FIG. 6(b) is a view of the rear side of the roof panel with a window, a section in the region of a roof frame at the rear.

The angled bars 23, 23' form a rest for a window 17, 18 as is illustrated in FIG. 6. The roof panel 1 is angled downward at its front and rear sides 3, 4 by an angle of at most 90°, so that the angled region is visible from the outside. The angled rail 23 is fastened from the inside with the vertical limb 25 to the end 3' of the roof panel 1. (FIG. 6a). The horizontal limb 24 of the angled bar 23 is connected to the roof frame 10. The essentially vertical limb 25 engages behind the angled end 3' of the front side 3 of the roof panel 1 and is connected to the latter.

The angled bars 23' which is connected to the rear roof frame 11 and the rear side 4 comprises an essentially horizontal limb 24' and an essentially vertical limb 25'. The essentially vertical limb 25' engages behind the angled end 4' of the rear side 4 of the roof panel 1 and is connected to the latter. In the horizontal limb 24', a duct which can be partially covered by a window (not illustrated) is provided at the transition to the vertical limb 25'.

FIGS. 7a and b show a detailed view of a preferred roof structure with a roof panel 1. It can be seen from a plan view obliquely from the front (FIG. 7a) that an angled bar 23 is fitted at the end 3' of the front side 3 of the roof panel 1, the horizontal limb 24 of which angled bar points forward and can be used for securing a window. FIG. 7b shows a view of the lower side of the roof panel 1 in this region. The lateral angled bar 20 butts on the front side 3 against the front angled bar 23, the horizontal limb 24 of which projects away forward from the roof panel 1 while the vertical limb 25 engages in the end 3' thereof.

A preferred joining process envisages the roof panel 1 first of all being joined to lateral angled bars 20, 20' and/or front and rear angled bars 23, 23' to form a roof module. A suitable joining process, for example spot-welding, laser welding, soldering, adhesively bonding and the like, can be selected in accordance with the combination of materials. The roof module is then connected to a vehicle cell, in particular to the side wall panel 1 and/or to the roof frame 10, 12, if front and/or rear angled bars 23 are provided, for example by adhesively bonding or by another suitable joining process, for example from the group of the processes mentioned above for joining the roof panel 1 and side wall panel. In this case too, the joining process is selected in accordance with the selected combination of materials.

The angled bars 20, 20', 23, 23' advantageously form an essentially moisture-proof connection with the edge strip 7 of the roof panel 1 and/or with the side wall panel 2, which connection can be soldered, welded, riveted, clinched and/or adhesively bonded. If a joining process is selected which does not directly result in a leakproof connection, it is expedient additionally also to provide a leakproof bonded seam.

The angled bars 20, 20', 23, 23' preferably extend approximately over the entire length of the longitudinal sides 5, 6 of the roof panel 1. The angled bar 20, 20', 23, 23' may optionally be of multipiece configuration. It is contemplated currently to use angled bars 20, 20', 23, 23' made from steel to permit easy joining of the material.

In a preferred refinement, lateral angled bars 20, 20' are provided on the longitudinal sides 5, 6 of the roof panel 1 if a roof panel made from steel is to be joined to a steel cell. At the front and rear ends 3, 4, a conventional roof channel may be provided to which the roof panel 1 is fastened, for example by spot welding, without wanting to achieve a narrow roof duct at the front and rear of these regions. According to the present invention, a very narrow and visually virtually imperceptible roof duct can be achieved at least along the longitudinal sides 5, 6.

In addition to the lateral angled bars 20, 20', front and rear angled bars 23, 23' may preferably also be provided on the front and rear sides of the roof panel 1 if a vehicle with a steel cell is to be joined to a hybrid roof, in which the roof panel 1 consists of a light metal, preferably aluminum or an aluminum alloy, or else is formed from various materials in a sandwich-type construction. It is likewise contemplated to use a roof panel made from plastic.

According to the present invention, the roof panel 1 can be jointed at its longitudinal sides 5, 6 and/or its front and/or its rear sides 3, 4 to a respective angled bar 20, 20', 23, 23' to form a roof module.

In the preferred refinement, this joining may take place during the body shell stage, so that the roof module is pre-manufactured separately. In such case, at least in principle, the roof duct between the roof panel 1 and side wall panels 2 can be soldered up or joined with a sealing foaming adhesive tape which expands upon an oven treatment and fills the roof duct. Such treatment steps are no longer readily possible during the assembly stage.

As an alternative, the roof module may be joined during the assembly of the vehicle without manufacturing the roof module separately.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. A roof structure for a vehicle, comprises a roof panel, side wall panels, and front and rear roof frames, wherein the roof panel has a front side, a rear side and longitudinal sides; the front roof frame is assigned to the front side of the roof panel and the rear roof frame is assigned to the rear side; the roof panel is connected at least indirectly at its longitudinal sides to the side wall panels; the roof panel is connected to at least one of the side wall panels, the front roof frame and the rear roof frame via at least one angled bar; an essentially vertical limb of the at least one angled bar projects upward to the roof panel; an essentially horizontal limb of the at least one angled bar, projects away from the side wall panel; the roof panel is angled downward at the longitudinal sides thereof with an edge strip connected to the vertical limb of the angled bar and the horizontal limb of the angled bar connected to a flange of the side wall panel; and the edge strip is angled away from the roof panel by at least 90°, so as to project under the roof panel.

2. The roof structure as claimed in claim 1, wherein an end of at least one of the front side and the rear side of the roof panel is of stepped configuration and ends in a lowered flange for receiving a window.

3. The roof structure as claimed in claim 1, wherein the horizontal limb projects away from the roof panel and is configured to receive a window and the vertical limb engages behind an angled end of at least one of the front side and rear side of the roof panel.

4. The roof structure as claimed in claim 3, wherein at least one of the front end and rear end of the roof panel is angled by at most 90°.

5. The roof structure as claimed in claim 1, wherein the at least one angled bar forms an essentially leakproof connection with at least one of the edge strip of the roof panel and the side wall panel.

6. The roof structure as claimed in claim 1, wherein the at least one angled bar is welded to the edge strip of the roof panel.

7. The roof structure as claimed in claim 1, wherein the at least one angled bar is adhesively bonded to the side wall panel.

8. The roof structure as claimed in claim 1, wherein the at least one angled bar extends approximately over the full length of a respective longitudinal side of the roof panel.

9. The roof structure as claimed in claim 1, wherein the at least one angled bar is comprised of multiple parts.

10. The roof structure as claimed in claim 1, wherein the at least one angled bar is comprised of steel.

11. The roof structure as claimed in claim 1, wherein the roof panel is a light-weight panel.

12. A method for producing a roof structure as claimed in claim 1, comprising joining the roof panel with at least one of the longitudinal sides thereof the front side thereof, and the rear side thereof to a respective one of the at least one angled bar to form a roof module.

13. The method as claimed in claim 12, wherein the roof module is joined in a body shell.

14. The method as claimed in claim 12, wherein the roof module is joined to a vehicle cell during assembly thereof.

* * * * *